(12) United States Patent
Wang

(10) Patent No.: US 7,773,376 B2
(45) Date of Patent: Aug. 10, 2010

(54) FOLDABLE ELECTRONIC DEVICE

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 12/254,148

(22) Filed: Oct. 20, 2008

(65) Prior Publication Data

US 2010/0008041 A1   Jan. 14, 2010

(30) Foreign Application Priority Data

Jul. 11, 2008   (CN) .................... 2008 1 0302711

(51) Int. Cl.
*H05K 5/00* (2006.01)
*H05K 7/00* (2006.01)

(52) U.S. Cl. .............................. 361/679.58; 361/679.55

(58) Field of Classification Search ............ 361/679.58; 292/80
See application file for complete search history.

(56) References Cited

U.S. PATENT DOCUMENTS 5,918,956 A * 7/1999 Scholder .................. 312/223.2
7,050,295 B2 * 5/2006 Kang .................... 361/679.58

* cited by examiner

*Primary Examiner*—Jayprakash N Gandhi
*Assistant Examiner*—Anthony M Haughton
(74) *Attorney, Agent, or Firm*—Clifford O. Chi

(57) ABSTRACT

An exemplary foldable electronic device includes a first cover, a second cover rotatably coupled to the first cover, a hooking portion, and a latching portion. The second cover defines an engaging hole. The hooking portion is positioned on the first cover, and the latching portion is positioned on the second cover. The hooking portion includes a deformable arm configured to engage in or disengage from the engaging hole of the second cover. The latching portion includes a slidable assembly configured to slide relative to the main body thereby deforming the arm to disengage from the engaging hole.

7 Claims, 5 Drawing Sheets

FOLDABLE ELECTRONIC DEVICE

BACKGROUND

1. Field of the Invention

The present disclosure generally relates to foldable electronic devices and, particularly, to a foldable electronic device having a top cover and a main body.

2. Description of the Related Art

Portable electronic devices, such as notebook computers, are popular for their portability. When a notebook computer is not being used, a cover is flipped over a main body for protecting a display on the cover and a keyboard on the main body and locked together by a typical latch mechanism. When the notebook computer is being used, the cover is opened from the main body.

However, the typical latch mechanism often has a protrusion connected to the main body via an elastic member and a hook disposed on the cover. The hook defines a slot therein. The protrusion has a curved surface. To flip the cover onto the main body, an external force is applied on the cover, the hook resists the protrusion, and slides along the curved surface to engage with the protrusion. In the process, a relatively large friction is created between the hook and the protrusion. Thus, the hook and the protrusion are easily abraded and over time, may not engage with each other.

Therefore, a new foldable electronic device is desired to overcome the above-described shortcomings.

SUMMARY

An exemplary foldable electronic device includes a first cover, a second cover rotatably coupled to the first cover, a hooking portion, and a latching portion. The second cover defines an engaging hole. The hooking portion is positioned on the first cover, and the latching portion is positioned on the second cover. The hooking portion includes a deformable arm configured to engage in or disengage from the engaging hole of the second cover. The latching portion includes a slidable assembly configured to slide relative to the main body thereby deforming the arm to disengage from the engaging hole.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present foldable electronic device. Moreover, in the drawings, like reference numerals designate corresponding parts throughout several views, and all the views are schematic.

DETAILED DESCRIPTION OF THE EMBODIMENTS

Reference will now be made to the drawings to describe one embodiment of the present foldable electronic device in detail.

The present foldable electronic devices, may be notebooks, cell phones, media players, and so on. In this embodiment, a notebook computer is used to describe the foldable electronic device of the present disclosure.

Figure 1:
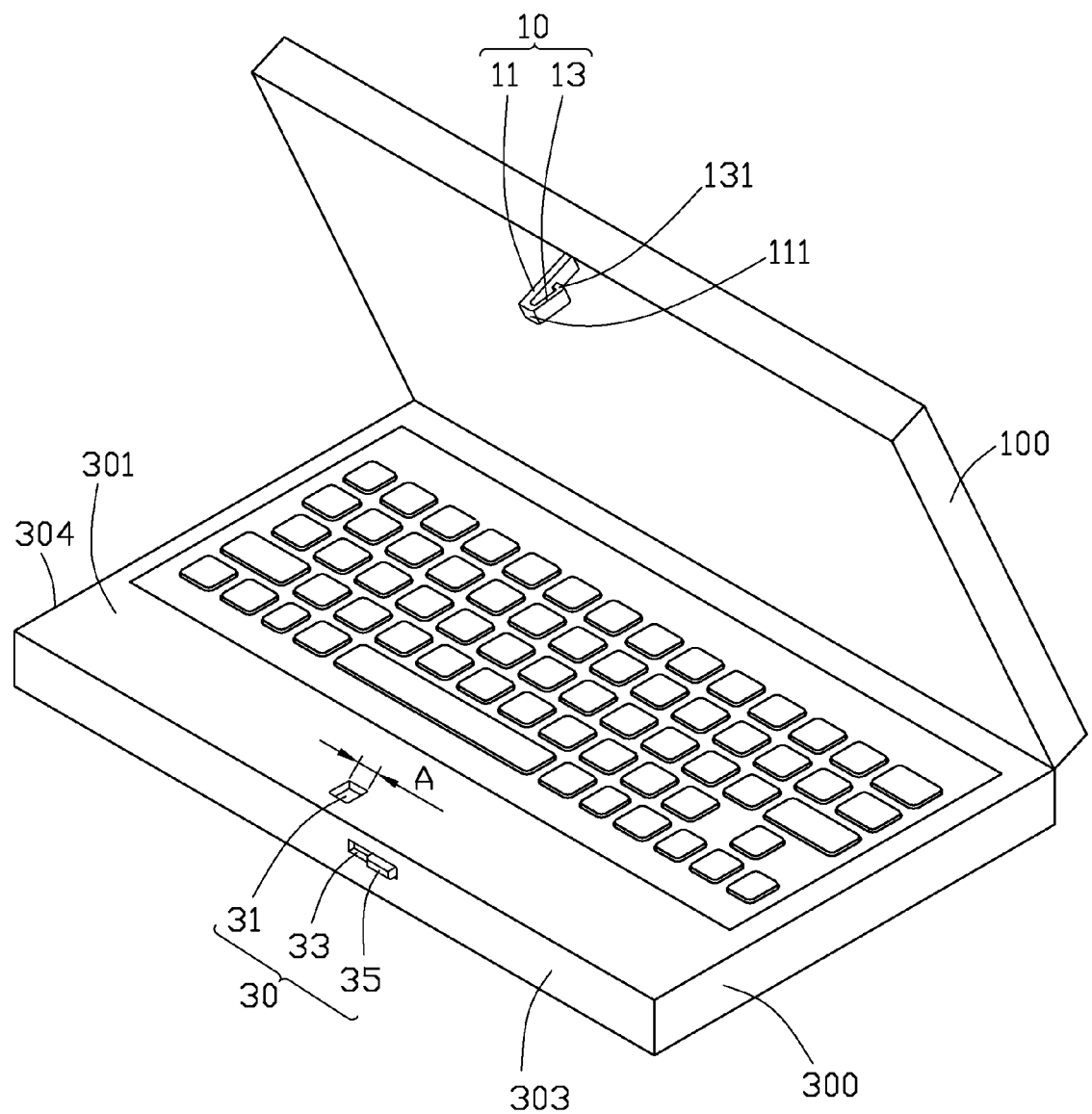
FIG. 1 is an assembled, isometric view of one embodiment of a foldable electronic device, the foldable electronic device including a top cover, a main body, a hooking portion, and a latching portion.

Referring to FIG. 1, a notebook computer (not labeled) includes a top cover 100, a main body 300, a hooking portion 10 positioned on the top cover 100, and a latching portion 30 positioned in the main body 300. The top cover 100 is rotatably mounted to the main body 300.

The hooking portion 10 includes a bracket 11 and an elastic arm 13 formed obliquely on an end of the bracket 11. The arm 13 has a connecting end 111 connected to the bracket 11 and a distal end 131 opposite to the connecting end 111. The distal end 131 forms a protrusion 1311 (see FIG. 3) extending toward the bracket 11. The protrusion 1311 is configured for preventing the arm 13 from bending too much towards the bracket 11 and breaking or being damaged. The hooking portion 10 is fixed to an edge of the top cover 100.

Figure 2:
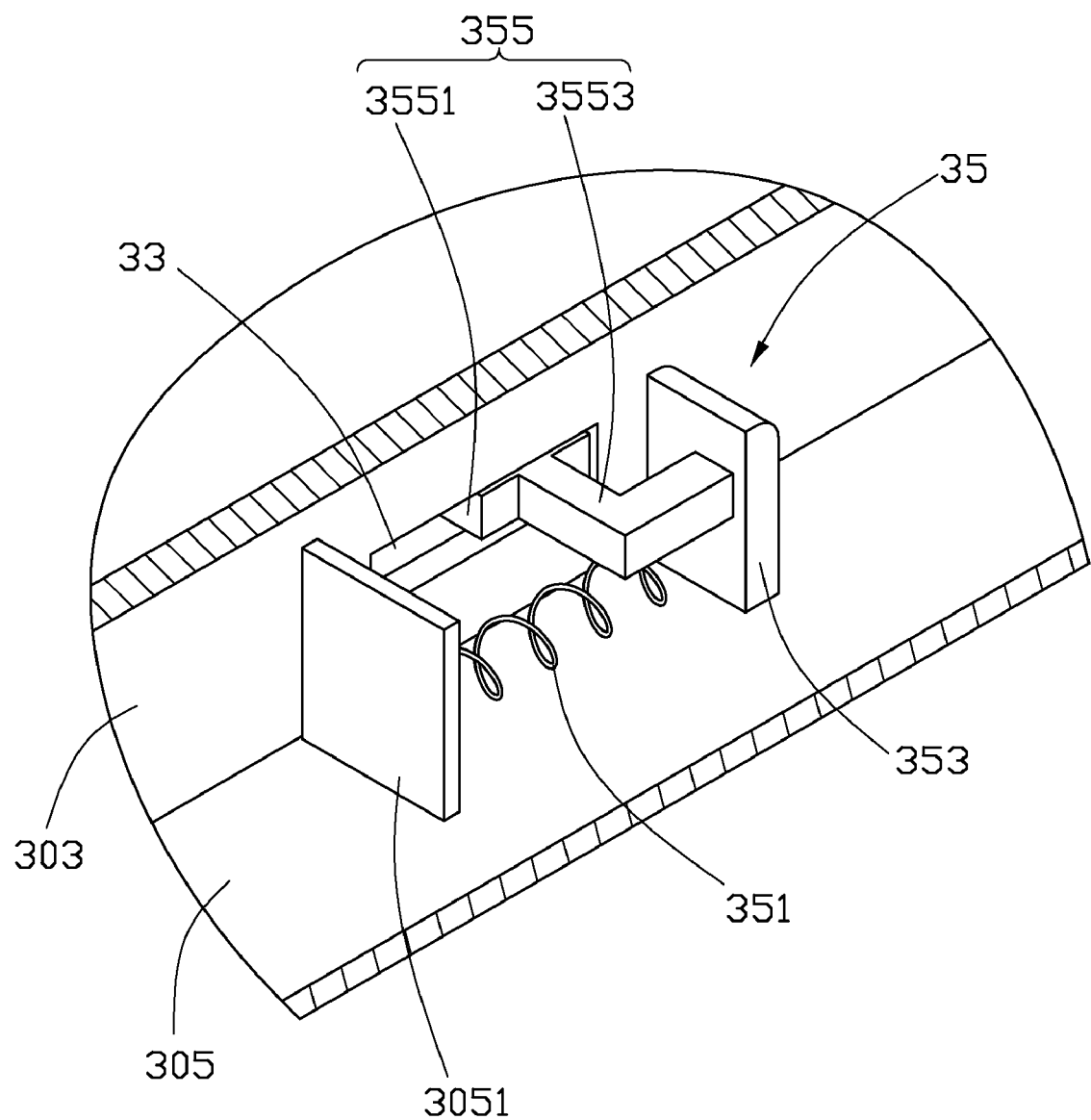
FIG. 2 is a partial isometric view of the latching portion of the foldable electronic device of FIG. 1.
Figure 3:
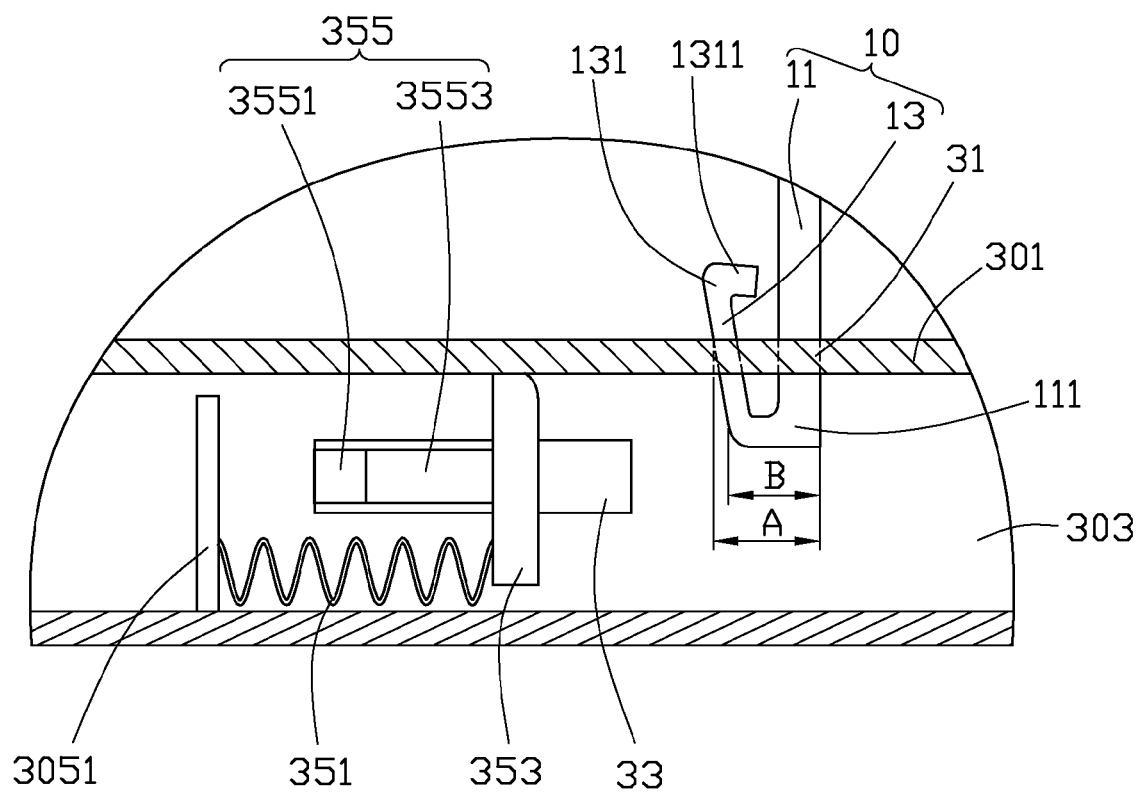
FIG. 3 is a cross-sectional view of the top cover flipped over the main body of the foldable electronic device of FIG. 1.
Figure 4:
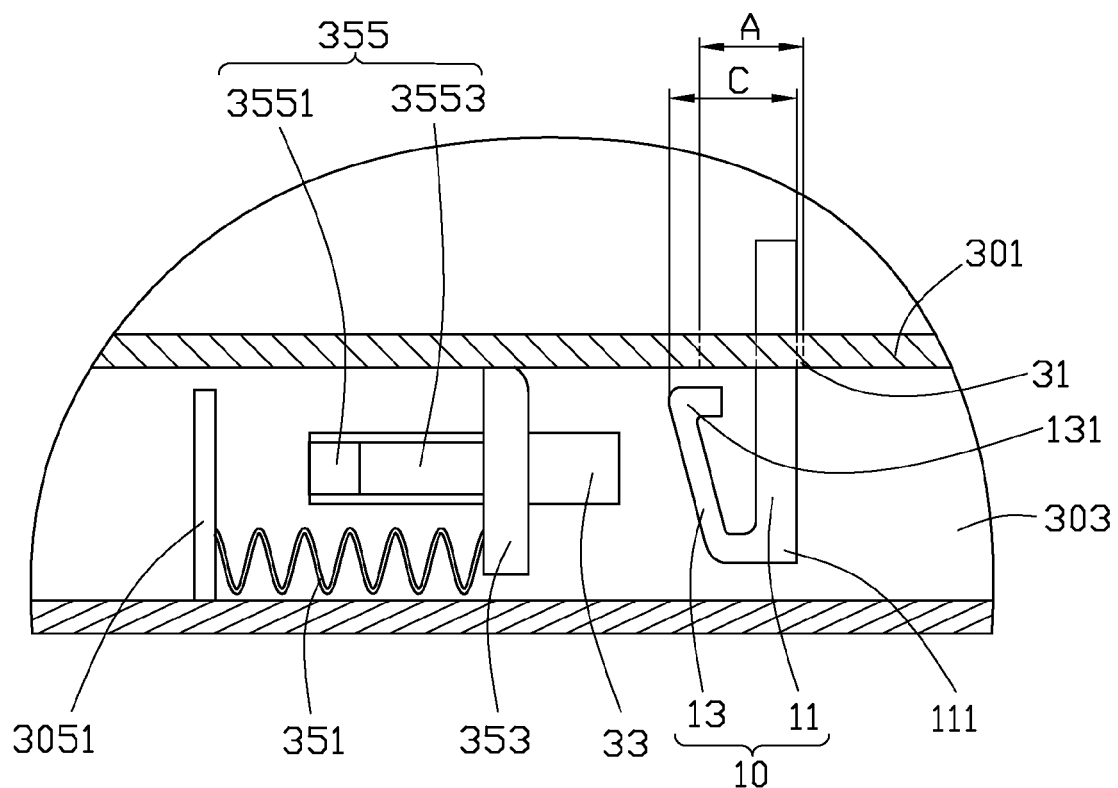
FIG. 4 is similar to FIG. 3, but shown with the top cover flipped over the main body.

Referring also to FIG. 2, the main body 300 includes a top wall 301, a sidewall 303 extending perpendicularly from the top wall 301, and a receptacle 305. The top wall 301 faces a display (not labeled) of the top cover 100. The receptacle 305 is defined below the top wall 301. The top wall 301 defines an engaging hole 31 communicating with the receptacle 305. The sidewall 303 defines a toggle slot 33 communicating with the receptacle 305. The main body 300 further includes a fixing plate 3051 fixed to the sidewall 303. The fixing plate 3051 is formed inside the receptacle 305 and perpendicular to the sidewall 303. Referring to FIG. 3 and FIG. 4, a length A of the engaging hole 31 is larger than a smallest width B of the hooking portion 10, but smaller than a largest width C of the hooking portion 10 when the arm 13 is in a free (normal) state. In this embodiment, a distance between the toggle slot 33 and an end 304 (see FIG. 1) is different from a distance between the engaging hole 31 and the end 304. In another embodiment, the distance between the toggle slot 33 and the end 304 may be the same as the distance between the engaging hole 31 and the end 304.

The latching portion 30 includes the engaging hole 31, the toggle slot 33, and a slidable assembly 35 received in the receptacle 305. Referring to FIG. 2 again, the slidable assembly 35 includes an elastic member 351, a pushing member 353, and a toggle 355 fixed to the pushing member 353. Opposite ends of the elastic member 351 are connected to the fixing plate 3051 and the pushing member 353. The elastic member 351 may be an extension helical spring, a leaf spring, or a rubber rod. In this embodiment, the elastic member 351 is an extension helical spring. The toggle 355 includes an operating portion 3551 and an L-shaped connecting portion 3553. Two ends of the connecting portion 3553 are connected to the pushing member 353 and the operating portion 3551.

During assembly, the slidable assembly 35 is received in the receptacle 305 with the operating portion 3551 protruding out of the sidewall 303 of the main body 300 via the toggle slot 33, and the ends of the elastic members 351 fixed to the main body 20. The operating portion 3551 is partially received in the toggle slot 33. The toggle 355 is slidable in the toggle slot 33 between a first position and a second position.

The connecting portion 3553 is configured to push against the pushing member 353 and overcoming the elastic forces of the elastic member 351. When the toggle 355 is in the first position, the elastic member 351 is in a free state or slightly extended. When the toggle 355 is in the second position, the elastic member 351 is extended, thereby providing an elastic force in the direction pointing to the first position.

Referring to FIGS. 1, 3, and 4, to fold the notebook computer, a first external force is applied to the top cover 100 to push the top cover 100 towards the main body 300, so that the hooking portion 30 gradually moves into the engaging hole 31 and the receptacle 305. The engaging hole 31 urges the arm 13 to deform towards the bracket 11. Once the distal end 131 of the arm 13 passes the engaging hole 31, the arm 13 returns (springs back) to the normal state. As a result, the arm 13 of the hooking portion 10 becomes locked in the receptacle 305, and the protrusion 1311 of the hooking portion 10 is engaged with the top wall 301 of the main body 300, thus latching the top cover 100 to the main body 300. This is because the length A of the engaging hole 31 is smaller than the largest width C of the hooking portion 10 when the arm 13 is in a free (normal) state.

Figure 5:
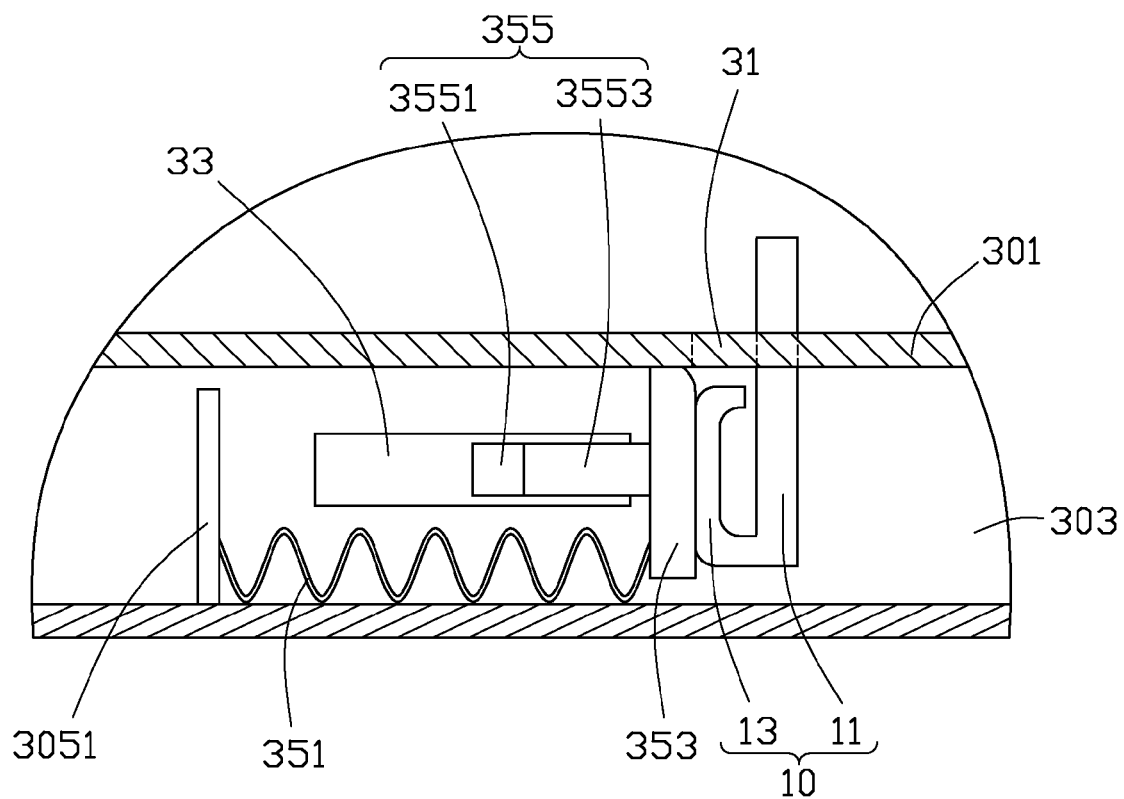
FIG. 5 is similar to FIG. 3, but shown with the top cover separated away from the main body.

Referring to FIG. 5, to open the top cover 100, a second external force is applied on the toggle 355 to slide the toggle 355 from the first position to the second position. As a result, the pushing member 353 pushes and deforms the arm 13 to deform and extends the elastic member 351. When the arm 13 deforms such that the width of the deformed hooking portion 10 is less than the length A of the engaging hole, a third external force is applied on the top cover 100 away from the main body 300. The hooking portion 10 becomes capable of disengaging from the engaging hole 31, thus unlatching the top cover 100 from the main body 300. Then the second external force may be removed, so that the elastic force of the elastic member 351 drives the toggle 355 and the pushing member 353 back to the first position.

In the embodiment, the arm 13 deforms to engage with the engaging hole 31 when the top cover 100 flipped onto the main body 300. A friction between the arm 13 and a wall of the engaging hole 31 is very small. Thus, the arm 13 and the wall of the engaging hole 31 have little to no abrasion, ensuring engagement of the arm 13 and the engaging hole 31.

In an alternative embodiment, the hooking portion 10 may be positioned on the main body 300 and the latching portion 30 may be positioned on the top cover 100.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A foldable electronic device, comprising:
   a first cover;
   a second cover rotatably coupled to the first cover, wherein an engaging hole is defined in the second cover, the second cover comprising a top wall, a sidewall adjoining the top wall, and a receptacle defined below the top wall; the top wall defining the engaging hole communicating with the receptacle; the sidewall defining a toggle slot communicating with the receptacle;
   a hooking portion positioned on the first cover, the hooking portion comprising a deformable arm configured to engage in or disengage from the engaging hole of the second cover and a bracket, the arm comprising a connecting end connected to the bracket and an opposite distal end, the distal end forming a protrusion extending toward the bracket; and
   a latching portion positioned on the second cover, the latching portion comprising a slidable assembly configured to slide relative to the main body thereby deforming the arm to disengage from the engaging hole, the slidable assembly comprising a pushing member, a toggle fixed to the pushing member, and an elastic member for resisting the second cover and the pushing member;
   wherein a length of the engaging hole is larger than a smallest width of the hooking portion, but smaller than a largest width of the hooking portion when the arm is in a free state; the toggle is configured for facilitating operating the slidable assembly to slide; the slidable assembly is received in the receptacle with a part of the toggle protruding out of the receptacle of the second cover via the toggle slot; the toggle is slidable in the toggle slot.

2. The foldable electronic device of claim 1, wherein the elastic member is an extension helical spring.

3. The foldable electronic device of claim 1, wherein a distance between the toggle slot and an end of the second cover is different from a distance between the engaging hole and the end of the second cover.

4. A foldable electronic device, comprising:
   a first cover;
   a second cover rotatably coupled to the first cover, wherein an engaging hole is defined in the second cover, the second cover comprising a top wall, a sidewall adjoining the top wall, and a receptacle defined below the top wall; the top wall defining the engaging hole communicating with the receptacle; the sidewall defining a toggle slot communicating with the receptacle;
   a hooking portion positioned on the first cover, the hooking portion comprising a deformable arm configured to engage in or disengage from the engaging hole of the second cover; and
   a latching portion positioned on the second cover, the latching portion comprising a slidable assembly configured to slide relative to the main body thereby deforming the arm to disengage from the engaging hole, the slidable assembly comprising a toggle to facilitate operating the slidable assembly to slide;
   wherein the slidable assembly is received in the receptacle with a part of the toggle protruding out of the receptacle of the second cover via the toggle slot; the toggle is slidable in the toggle slot.

5. The foldable electronic device of claim 4, wherein the slidable assembly further comprises a pushing member and an elastic member for resisting the second cover and the pushing member; the toggle is fixed to the pushing member.

6. The foldable electronic device of claim 5, wherein the elastic member is an extension helical spring.

7. The foldable electronic device of claim 5, wherein a distance between the toggle slot and an end of the second cover is different from a distance between the engaging hole and the end of the second cover.

* * * * *